US009108464B2

(12) United States Patent
Lopitaux et al.

(10) Patent No.: US 9,108,464 B2
(45) Date of Patent: Aug. 18, 2015

(54) RUBBER COMPOSITION FOR A TIRE CONTAINING EPOXIDE NATURAL RUBBER AND A PLASTICIZING RESIN

(75) Inventors: Garance Lopitaux, Valignat (FR); Didier Vasseur, Clermont-Ferrand (FR); Kyoko Kobayashi, Bangkok (TH)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 13/139,225

(22) PCT Filed: Dec. 16, 2009

(86) PCT No.: PCT/EP2009/009044
§ 371 (c)(1),
(2), (4) Date: Nov. 1, 2011

(87) PCT Pub. No.: WO2010/069559
PCT Pub. Date: Jun. 24, 2010

(65) Prior Publication Data
US 2012/0041098 A1    Feb. 16, 2012

(30) Foreign Application Priority Data
Dec. 19, 2008    (FR) .................... 08 58862

(51) Int. Cl.
*B60C 1/00* (2006.01)
*C08L 25/16* (2006.01)
*C08L 15/00* (2006.01)
*C08C 19/06* (2006.01)
*C08K 3/04* (2006.01)
*C08K 3/36* (2006.01)
*C08K 5/00* (2006.01)

(52) U.S. Cl.
CPC .............. *B60C 1/0016* (2013.04); *C08L 15/00* (2013.01); *C08L 25/16* (2013.01); *C08C 19/06* (2013.01); *C08K 3/04* (2013.01); *C08K 3/36* (2013.01); *C08K 5/0016* (2013.01)

(58) Field of Classification Search
CPC ..................................... B60C 1/0016
USPC ......................................... 523/438
See application file for complete search history.

(56) References Cited

U.S. PATENT DOCUMENTS

| 5,196,460 | A | * | 3/1993 | Lora et al. ........................ 524/76 |
| 6,774,255 | B1 | | 8/2004 | Tardivat et al. |
| 6,849,754 | B2 | | 2/2005 | Deschler et al. |
| 7,217,751 | B2 | | 5/2007 | Durel et al. |
| 7,371,791 | B2 | | 5/2008 | Hattori et al. |
| 2004/0051210 | A1 | | 3/2004 | Tardivat et al. |
| 2005/0016650 | A1 | | 1/2005 | Durel et al. |
| 2005/0016651 | A1 | | 1/2005 | Durel et al. |
| 2005/0209390 | A1 | * | 9/2005 | Yagi et al. ....................... 524/493 |
| 2006/0192483 | A1 | * | 8/2006 | Nakanishi et al. ............. 313/504 |
| 2007/0037908 | A1 | | 2/2007 | Pille-Wolf |
| 2008/0314484 | A1 | * | 12/2008 | Nishioka et al. ............ 152/209.1 |
| 2009/0247720 | A1 | * | 10/2009 | Wang et al. ........................ 528/7 |

FOREIGN PATENT DOCUMENTS

| EP | 0 644 235 A1 | 3/1995 |
| EP | 1 577 341 A1 | 9/2005 |
| JP | 2008-303328 A | 12/2008 |
| WO | WO 97/36724 A2 | 10/1997 |
| WO | WO 99/09036 A1 | 2/1999 |
| WO | WO 99/16600 A1 | 4/1999 |
| WO | WO 02/30939 A1 | 4/2002 |
| WO | WO 02/31041 A1 | 4/2002 |
| WO | WO 02/083782 A1 | 10/2002 |
| WO | WO 03/002648 A1 | 1/2003 |
| WO | WO 03/002649 A1 | 1/2003 |
| WO | WO 03/016837 A1 | 2/2003 |
| WO | WO 2005/087859 A1 | 9/2005 |
| WO | WO 2006/023815 A2 | 3/2006 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007/061550 A1 | 5/2007 |
| WO | WO 2007/098080 A2 | 8/2007 |
| WO | WO 2008/003434 A1 | 1/2008 |
| WO | WO 2008/003435 A1 | 1/2008 |

OTHER PUBLICATIONS

AMS Phenolics [online] 2009 [retrieved on Mar. 13, 2014]. Retrieved from the internet: http://www.arizonachemical.com/Products/Adhesive-Resins/AMS-Phenolics/).*
Arizona Chemical ("Tackifiers for Adhesives" European Edition [online] Feb. 2010 [retrieved on Mar. 13, 2014]. Retrieved from the internet: http://www.arizonachemical.com/Global/Brochures/Tackifiers_for_Adhesives_%20European_Edition_Feb10.pdf).*
International Search Report (PCT/ISA/210) issued on Mar. 3, 2010, by European Patent Office as the International Searching Authority for International Application No. PCT/EP2009/009044.

* cited by examiner

Primary Examiner — Vickey Nerangis
(74) Attorney, Agent, or Firm — Dickinson Wright PLLC

(57) ABSTRACT

The present invention relates to a rubber composition based on at least an epoxidized natural rubber (ENR), a reinforcing filler and, as plasticizing agent, an alpha-methylstyrene polymer resin. The invention also relates to the use of such a composition for the manufacture of a tire tread exhibiting an improved compromise of properties with respect to grip on wet ground and rolling resistance.

19 Claims, No Drawings

RUBBER COMPOSITION FOR A TIRE CONTAINING EPOXIDE NATURAL RUBBER AND A PLASTICIZING RESIN

The present invention relates to rubber compositions intended, in particular, for the manufacture of tyres or of semi-finished products for tyres, it relates more particularly to rubber compositions based on epoxidized natural rubber (hereinbelow "ENR") and plasticizing systems, that can be used for the manufacture of tyre treads.

As is known, a tyre tread has to meet a large number of often conflicting technical requirements, including a low rolling resistance, a high wear resistance and a high grip on both the dry road and the wet road.

The combined improvement of the rolling resistance and grip properties remains a constant concern of tyre designers.

It is known to use ENR elastomers in tyre treads for improving some of their standard properties, in particular the performances of grip on wet ground, rolling resistance and abrasion resistance, as described, for example, in documents U.S. Pat. No. 7,371,791, EP 0644235 or EP 1577341.

Furthermore, rubber compositions for tyres comprise, in a known way, plasticizing agents used for the preparation or synthesis of certain diene elastomers, for improving the processability of said compositions in the uncured state and also some of their standard properties in the cured state such as, for example, in the case of tyre treads, their grip on wet ground or else their abrasion and cut resistance. In particular, application WO 2005/087859 described the use of terpene hydrocarbon-based resins, such as polylimonene resins for improving the chipping resistance.

Terpene (co)polymer resins have also been used for manufacturing ENR-based rubber compositions (see aforementioned patent U.S. Pat. No. 7,371,791), intended for tyre treads having improved abrasion resistance.

Following their research, the Applicants have discovered a novel rubber composition, comprising an ENR elastomer combined with a specific plasticizing agent, which makes it possible to obtain a further improved compromise of properties, favourable to the grip on wet ground and the rolling resistance of tyre treads.

Thus, a first subject of the invention relates to a rubber composition that can be used in particular as tyre tread, based on at least:
  an epoxidized natural rubber (ENR);
  a reinforcing filler;
  as plasticizing agent, an alpha-methylstyrene polymer resin.

Another subject of the invention is these tyres themselves, when they comprise a composition in accordance with the invention, in particular in their tread.

The tyres of the invention are particularly intended to be fitted on motor vehicles of the passenger type, SUV ("Sport Utility Vehicles") type, two-wheel vehicles (especially motorcycles) and aircraft, such as industrial vehicles chosen from vans, heavy vehicles—i.e. underground trains, buses, road transport vehicles (lorries, towing vehicles, trailers), off-road vehicles such as agricultural or civil-engineering vehicles—, and other transport or handling vehicles.

The invention and its advantages will be readily understood in light of the description and the exemplary embodiments that follow.

I—MEASUREMENTS AND TESTS USED

The rubber compositions are characterized, before and after curing, as indicated below.

I.1—Tensile Tests

These tests make it possible to determine the elasticity stresses and the properties at break. Unless otherwise indicated, they are carried out in accordance with the French standard NF T 46-002 of September 1988. At second elongation (i.e. after an accommodation cycle at the extension rate provided for the measurement itself) the nominal secant moduli (or apparent stresses, in MPa) are measured at 100% elongation (denoted by MA100). The tensile strengths (in MPa, denoted by CR) and the elongations at break (in %, denoted by AR) are also measured. All these tensile measurements are carried out under standard temperature ($23\pm2°$ C.) and moisture ($50\pm5\%$ relative humidity) conditions, according to the French standard NF T 40-101 (December 1979).

I.2—Shore A Hardness

The Shore A hardness of the compositions after curing is assessed in accordance with the standard ASTM D 2240-86.

I.3—Dynamic Properties

The dynamic properties are measured on a viscosity analyzer (Metravib VA4000) according to the standard ASTM D 5992-96. The response of a sample of vulcanized composition (cylindrical test specimen with a thickness of 4 mm and with a cross section of 400 $mm^2$), subjected to a simple alternating sinusoidal shear stress, at a frequency of 10 Hz, is recorded during a temperature sweep at a fixed stress of 0.7 MPa; the value of $tan(\delta)$ observed at $-10°$ C. (i.e. $tan(\delta)_{-10° C.}$) and the value of $tan(\delta)$ observed at $40°$ C. (i.e. $tan(\delta)_{40° C.}$) are recorded.

It is recalled, in a manner well known to a person skilled in the art, that the value of $tan(\delta)_{-10° C.}$ is representative of the potential to grip on wet ground: the higher $tan(\delta)_{-10° C.}$, the better the grip. The value of $tan(\delta)_{40° C.}$ is representative of the hysteresis of the material, and therefore of the rolling resistance: the lower $tan(\delta)_{40° C.}$, the lower the rolling resistance.

II—CONDITIONS FOR IMPLEMENTING THE INVENTION

The expression composition "based on" should be understood to mean a composition comprising the blend of the various constituents used and/or the reaction product resulting therefrom, some of these base constituents being able, or intended, to react at least partly with one another during the various phases for manufacturing the composition, in particular during the crosslinking or vulcanization thereof.

In the present description, unless expressly indicated otherwise, all the percentages (%) indicated are % by weight. Moreover, any interval of values denoted by the expression "between a and b" represents the range of values going from more than a to less than b (i.e. the limits a and b excluded) whereas any interval of values denoted by the expression "from a to b" means the range of values going from a to b (i.e. including the strict limits a and b).

The rubber composition according to the invention therefore comprises at least an epoxidized natural rubber (ENR), a reinforcing filler and, as plasticizing agent, an alpha-methylstyrene polymer resin, which components will be described in detail below.

II.1—Epoxidized Natural Rubber

The rubber composition in accordance with the invention has a first essential feature of comprising an epoxidized natural rubber (abbreviated to "ENR").

Epoxidized natural rubbers are used for their properties of excellent abrasion resistance, fatigue resistance, flexural strength, and may in particular be used for manufacturing tyre treads or sidewalls.

They may be obtained by epoxidation of natural rubber, for example via processes based on chlorohydrin or bromohydrin or processes based on hydrogen peroxides, alkyl hydroperoxides or peracids (such as peracetic acid or performic acid).

The degree of epoxidation (mol %) of ENR is preferably at least 3%, more preferably at least 5%, for example in a range of 10 to 60%. When the degree of epoxidation is less than 3%, the targeted technical effect (improvement of grip and of rolling resistance) risks being insufficient; beyond 60%, the molecular weight of the polymer greatly decreases. For all these reasons, the degree of epoxidation of the ENR is more preferably within a range of 10% to 50%.

Preferential ENRs are commercially available, for example sold under the names "ENR-25" and "ENR-50" (respective degrees of epoxidation of 25% and 50%) by Guthrie Polymer.

The rubber composition according to the invention preferably comprises more than 30 phr, more preferably more than 40 phr of ENR; more preferably still, the ENR content is within a range of 50 to 100 phr, in particular within a range of 70 to 100 phr.

One or more other diene elastomer(s) may be combined with the above epoxidized natural rubber. The term "diene" elastomer or rubber should be understood, in a known manner, to mean an elastomer resulting at least in part (i.e., a homopolymer or a copolymer) from diene monomers (monomers bearing two carbon-carbon double bonds which may or may not be conjugated).

The optional additional diene elastomer is preferably chosen from the group of highly unsaturated diene elastomers formed by polybutadienes (BRs), synthetic polyisoprenes (IRs), natural rubber (NR), butadiene copolymers, isoprene copolymers and mixtures of these elastomers. Such copolymers are more preferably chosen from the group formed by butadiene-styrene copolymers (SBRs), isoprene-butadiene copolymers (BIRs), isoprene-styrene copolymers (SIRs) and isoprene-butadiene-styrene copolymers (SBIRs).

Particularly suitable are polybutadienes having a content (mol %) of 1,2-units of between 4% and 80% or those having a content (mol %) of cis-1,4-units of greater than 80%, butadiene-styrene copolymers and in particular those having a $T_g$ (glass transition temperature, measured according to ASTM D3418) of between 0° C. and −70° C. and more particularly between −10° C. and −60° C., a styrene content of between 5% and 60% by weight and more particularly between 20% and 50% by weight, a content (mol %) of 1,2-bonds of the butadiene part of between 4% and 75% and a content (mol %) of trans-1,4-bonds of between 10% and 80%, butadiene-isoprene copolymers and in particular those having an isoprene content of between 5% and 90% by weight and a $T_g$ of −40° C. to −80° C., or isoprene-styrene copolymers and in particular those having a styrene content of between 5% and 50% by weight and a $T_g$ of between −10° C. and −50° C.

In the case of butadiene-styrene-isoprene copolymers, suitable ones are especially those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40% by weight, a content (mol %) of 1,2-units of the butadiene part of between 4% and 85%, a content (mol %) of trans-1,4-units of the butadiene part of between 6% and 80%, a content (mol %) of 1,2-units plus 3,4-units of the isoprene part of between 5% and 70% and a content (mol %) of trans-1,4-units of the isoprene part of between 10% and 50%, and more generally any butadiene-styrene-isoprene copolymer having a $T_g$ of between −20° C. and −70° C.

According to another particular embodiment, the optional additional diene elastomer could also be an isoprene elastomer. The expression "isoprene elastomer" is understood, in a known manner, to mean an isoprene homopolymer or copolymer, in other words a diene elastomer chosen from the group formed by natural rubber (NR), synthetic polyisoprenes (IRs), various isoprene copolymers and blends of these elastomers. Among the isoprene copolymers, mention will in particular be made of isobutene-isoprene copolymers (butyl rubber—IIRs), isoprene-styrene copolymers (SIRs), isoprene-butadiene copolymers (BIRs) or isoprene-butadiene-styrene copolymers (SBIRs). This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

The content of optional additional diene elastomer is preferably at most equal to 70 phr, more preferably less than 60 phr, and in particular within a range from 0 to 30 phr.

II.2—Reinforcing Filler

Use may be made of any type of reinforcing filler known for its capabilities of reinforcing a rubber composition which can be used for the manufacture of tyres, for example an organic filler, such as carbon black, a reinforcing inorganic filler, such as silica, or else a blend of these two types of filler, in particular a blend of carbon black and silica.

All carbon blacks, in particular blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example, N660, N683 or N772). The carbon blacks could, for example, already be incorporated in an isoprene elastomer in the form of a masterbatch (see, for example, applications WO 97/36724 or WO 99/16600).

Mention may be made, as examples of organic fillers other than carbon blacks, of the functionalized polyvinyl organic fillers as described in Applications WO-A-2006/069792, WO-A-2006/069793, WO-A-2008/003434 and WO-A-2008/003435.

The expression "reinforcing inorganic filler" should be understood, in the present patent application, by definition, to mean any inorganic or mineral filler (whatever its colour and its natural or synthetic origin), also known as "white filler", "clear filler" or even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

The physical state in which the reinforcing inorganic filler is provided is not important, whether it is in the form of a powder, of micropearls, of granules, of beads or any other appropriate densified form. Of course, the expression "reinforcing inorganic filler" is also understood to mean mixtures of various reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used may be any reinforcing silica known to a person skilled in the art, in particular any precipitated or pyrogenic silica having a BET surface area and a CTAB specific surface area that are both less than 450 m²/g, preferably from 30 to 400 m²/g. Mention will be made, as highly dispersible precipitated silicas ("HDSs"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in Application WO 03/16837.

The reinforcing inorganic filler used, in particular if it is silica, preferably has a BET surface area of between 45 and 400 m²/g, more preferably of between 60 and 300 m²/g.

Preferably, the content of total reinforcing filler (carbon black and/or reinforcing inorganic filler, such as silica) is greater than 50 phr, more preferably between 50 and 150 phr, the optimum being, in a known manner, different depending on the particular applications targeted: the level of reinforcement expected with regard to a bicycle tyre, for example, is, of course, less than that required with regard to a tyre capable of running at high speed in a sustained manner, for example a motorcycle tyre, a tyre for a passenger vehicle or a tyre for a utility vehicle, such as a heavy vehicle.

According to a preferred embodiment of the invention, use is made of a reinforcing filler comprising between 50 and 150 phr, more preferably between 50 and 130 phr, of inorganic filler, particularly silica, and optionally carbon black; the carbon black, when it is present, is preferably used at a content of less than 20 phr, more preferably of less than 10 phr (for example between 0.1 and 10 phr).

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of polysulphide-containing silanes, referred to as "symmetrical" or "asymmetrical" depending on their particular structure, as described, for example, in Applications WO 03/002648 (or US 2005/016651) and WO 03/002649 (or US 2005/016650).

Particularly suitable, without the definition below being limiting, are polysulphide-containing silanes corresponding to the following general formula (I):

Z-A-$S_x$-A-Z, (I)

in which:
x is an integer from 2 to 8 (preferably from 2 to 5);
the A symbols, which are identical or different, represent a divalent hydrocarbon radical (preferably, a $C_1$-$C_{18}$ alkylene group or a $C_6$-$C_{12}$ arylene group, more particularly a $C_1$-$C_{10}$, in particular $C_1$-$C_4$, alkylene, in particular propylene);
the Z symbols, which are identical or different, correspond to one of the three formulae below:

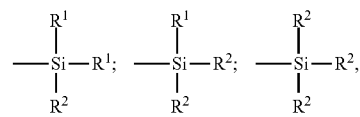

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of polysulphide-containing alkoxysilanes corresponding to the above formula (I), in particular the usual mixtures available commercially, the mean value of the "x" index is a fractional number preferably between 2 and 5, more preferably in the vicinity of 4. However, the invention may also advantageously be carried out, for example, with disulphide-containing alkoxysilanes (x=2).

Mention will more particularly be made, as examples of polysulphide-containing silanes, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl)polysulphides or bis(3-triethoxysilylpropyl)polysulphides. Use is in particular made, among these compounds, of bis(3-triethoxysilylpropyl)tetrasulphide, abbreviated to TESPT, of formula [($C_2H_5O)_3Si(CH_2)_3S_2]_2$, or bis(triethoxysilylpropyl)disulphide, abbreviated to TESPD, of formula [($C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethyl-silylpropyl)tetrasulphide, as described in the aforementioned Patent Application WO 02/083782 (or U.S. Pat. No. 7,217,751).

Mention will in particular be made, as an example of coupling agents other than a polysulphide-containing alkoxysilane, of bifunctional POSs (polyorganosiloxanes) or else of hydroxysilane polysulphides ($R^2$=OH in the above formula I), such as described, for example, in patent applications WO 02/30939 (or U.S. Pat. No. 6,774,255), WO 02/31041 (or US 2004/051210) and WO 2007/061550, or else of silanes or POSs bearing azodicarbonyl functional groups, such as described, for example, in patent applications WO 2006/125532, WO 2006/125533 and WO 2006/125534.

Mention will be made, as examples of other sulphide-containing silanes, of, for example, the silanes bearing at least one thiol (—SH) function (known as mercaptosilanes) and/or at least one blocked thiol function, as described, for example, in Patents or Patent Applications U.S. Pat. No. 6,849,754, WO 99/09036, WO 2006/023815 and WO 2007/098080.

Of course, mixtures of the coupling agents described previously could also be used, such as described in particular in the aforementioned patent application WO 2006/125534.

In the protective elastomer layers, when they are reinforced by an inorganic filler such as silica, the content of coupling agent is preferably between 4 and 15 phr, more preferably between 4 and 12 phr.

A person skilled in the art will understand that, as equivalent filler to the reinforcing inorganic filler described in the present section, a reinforcing filler of another nature, in particular organic nature, could be used provided that this reinforcing filler is covered with an inorganic layer, such as silica, or else comprises functional sites, in particular hydroxyl sites, at its surface that require the use of a coupling agent in order to form the connection between the filler and the elastomer.

II.3—Alpha-Methylstyrene Polymer Resin

The composition according to the invention has another essential feature of comprising, as a plasticizing agent, an alpha-methylstyrene polymer resin.

In a manner known to a person skilled in the art, the term "resin" is reserved in the present patent application, by definition, for a compound which is, on the one hand, solid at ambient temperature (23° C.) (in contrast to a liquid plasticizing compound such as an oil) and, on the other hand, compatible (i.e. miscible at the level used) with the rubber composition for which it is intended, so as to act as a true diluting agent.

Hydrocarbon resins are polymers well known to a person skilled in the art which are miscible by nature in the diene elastomer compositions when they are additionally described as being "plasticizing". They have been described, for example, in the work entitled "Hydrocarbon Resins" by R. Mildenberg, M. Zander and G. Collin (New York, VCH, 1997, ISBN 3-527-28617-9), chapter 5 of which is devoted to their applications, in particular in the tyre rubber field (5.5. "Rubber Tires and Mechanical Goods").

Preferably, the alpha-methylstyrene polymer resin has at least one, more preferably all, of the following features:
- a $T_g$ of greater than 20° C., more preferably of greater than 30° C.;
- a number-average molecular weight ($M_n$) of between 400 and 2000 g/mol, more preferably between 500 and 1500 g/mol;
- a polydispersity index ($I_p$) of less than 3, preferably of less than 2 (NB: $I_p=M_w/M_n$ with $M_w$ being the weight-average molecular weight).

The glass transition temperature $T_g$ is measured in a known manner by DSC (Differential Scanning Calorimetry), according to the ASTM D3418 standard (1999). The macrostructure ($M_w$, $M_n$ and $I_p$) of the alpha-methylstyrene polymer resin is determined by size exclusion chromatography (SEC): solvent tetrahydrofuran; temperature 35° C.; concentration 1 g/l; flow rate 1 ml/min; solution filtered through a filter with a porosity of 0.45 µm before injection; Moore calibration with polystyrene standards; set of 3 "WATERS" columns in series ("STYRAGEL" HR4E, HR1 and HR0.5); detection by differential refractometer ("WATERS 2410") and its associated operating software ("WATERS EMPOWER").

The expression "alpha-methylstyrene polymer resin" is understood within the present patent application, by definition, to mean any homopolymer of the alpha-methylstyrene monomer, any copolymer comprising at least some units derived from the alpha-methylstyrene monomer and units derived from one other or several other monomer(s), or else any blend of such polymers.

In the case of a copolymer, the content of units derived from the alpha-methylstyrene monomer is preferably greater than 50%, more preferably greater than 60%, in particular within a range from 70 to 95% (mol %).

According to one particular embodiment of the invention, an alpha-methylstyrene homopolymer is used. According to another particular embodiment, use is made of a copolymer of at least the following two monomers: alpha-methylstyrene on the one hand, styrene on the other hand.

By way of example of preferred resins, mention may especially be made of the phenol-modified alpha-methylstyrene resins, in particular the phenol-modified resins of styrene/alpha-methylstyrene copolymer. In order to characterize these phenol-modified resins, it is recalled that use is made, in a known manner, of a value known as the "hydroxyl value" (measured according to standard ISO 4326 and expressed as mg KOH/g).

The alpha-methylstyrene resins, in particular the phenol-modified alpha-methylstyrene resins, described above are well known to a person skilled in the art and are commercially available, for example sold by Arizona Chemical under the names "Sylvares 540" ($M_n$ 620 g/mol; $I_p$ 1.3; $T_g$ 36° C.; hydroxyl value 56 mg KOH/g); "Sylvares 600" ($M_n$ 850 g/mol; 1.4; $T_g$ 50° C.; hydroxyl value of 31 mg KOH/g).

Preferably, the content of alpha-methylstyrene polymer resin is within a range from 5 to 60 phr. Below the minimum indicated, the targeted technical effect may prove insufficient, whereas beyond the maximum, the tack of the compositions in the uncured state, on the mixing tools, may in certain cases become unacceptable from an industrial standpoint. For these reasons, the content of alpha-methylstyrene polymer resin is more preferably within a range from 10 to 50 phr.

II.4—Various Additives

The rubber compositions in accordance with the invention also comprise all or some of the usual additives customarily used in the elastomer compositions intended in particular for the manufacture of treads, such as, for example, pigments, protective agents, such as antiozone waxes, chemical antiozonants, antioxidants, plasticizing agents other than those mentioned above, for example extender oils, whether the latter are of aromatic or non-aromatic nature, in particular non-aromatic or very weakly aromatic oils, for example of naphthenic or paraffinic type, having a high viscosity or preferably having a low viscosity, MES oils, TDAE oils, plant oils, antifatigue agents, reinforcing resins, methylene acceptors (for example, phenol-novolac resin) or methylene donors (for example, HMT or H3M), a crosslinking system based either on sulphur or on sulphur donors and/or on peroxide and/or on bismaleimides, vulcanization accelerators and vulcanization activators.

These compositions may also comprise, in addition to coupling agents, coupling activators, agents for covering the inorganic fillers or more generally processing aids capable, in a known manner, by virtue of an improvement in the dispersion of the filler in the rubber matrix and of a lowering in the viscosity of the compositions, of improving their ability to be processed in the uncured state, these agents being, for example, hydrolysable silanes, such as alkylalkoxysilanes, polyols, polyethers, primary, secondary or tertiary amines or hydroxylated or hydrolysable polyorganosiloxanes.

II.5—Preparation of the Rubber Compositions

The compositions of the invention may be manufactured in appropriate mixers using two successive preparation phases well known to a person skilled in the art: a first phase of thermomechanical working or kneading (referred to as a "non-productive" phase) at high temperature, up to a maximum temperature of between 110° C. and 190° C., preferably between 130° C. and 180° C., followed by a second phase of mechanical working (referred to as a "productive" phase) up to a lower temperature, typically below 110° C., for example between 40° C. and 100° C., finishing phase during which the crosslinking system is incorporated.

The process for preparing such compositions comprises, for example, the following stages:

incorporating into an ENR diene elastomer, during a first stage (referred to as a "non-productive" stage), at least a reinforcing filler and an alpha-methylstyrene polymer resin, everything being kneaded thermomechanically (for example in one or more steps), until a maximum temperature of between 110° C. and 190° C. is reached;

cooling the combined mixture to a temperature below 100° C.;

subsequently incorporating, during a second stage (referred to as a "productive" stage), a crosslinking system;

kneading everything up to a maximum temperature below 110° C.

By way of example, the non-productive phase is carried out in a single thermomechanical stage during which, in a first step, all the necessary base constituents (ENR and optional other diene elastomer, alpha-methylstyrene polymer resin, reinforcing filler and coupling agent in the case of an inorganic filler) are introduced into an appropriate mixer, such as a standard internal mixer, followed, in a second step, for example after kneading for one to two minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated in an external mixer, such as an open mill, maintained at a low temperature (for example, between 40° C. and 100° C.): The combined mixture is then mixed (productive phase) for a few minutes, for example between 2 and 15 min.

The crosslinking system itself is preferably based on sulphur and on a primary vulcanization accelerator, in particular an accelerator of the sulphenamide type. Added to this vulcanization system, are various known secondary accelerators or vulcanization activators, such as zinc oxide, stearic acid, guanidine derivatives (in particular diphenylguanidine), etc., incorporated during the first non-productive phase and/or during the productive phase. The sulphur content is preferably between 0.5 and 3.0 phr and the primary accelerator content is preferably between 0.5 and 5.0 phr.

Use may be made, as (primary or secondary) accelerator, of any compound capable of acting as accelerator of the vulcanization of diene elastomers in the presence of sulphur, in particular accelerators of the thiazole type and also their derivatives, accelerators of the thiuram and zinc dithiocarbamate types. These accelerators are more preferably chosen from the group formed by 2-mercaptobenzothiazol disulphide (abbreviated to "MBTS"), N-cyclohexyl-2-benzothiazyl sulphenamide (abbreviated to "CBS"), N,N-dicyclohexyl-2-benzothiazyl sulphenamide (abbreviated to "DCBS"), N-teal-butyl-2-benzothiazyl sulphenamide (abbreviated to "TBBS"), N-tert-butyl-2-benzothiazyl sulphenimide (abbreviated to "TBSI"), zinc dibenzyldithiocarbamate (abbreviated to "ZBEC") and the mixtures of these compounds. Preferably, a primary accelerator of the sulphenamide type is used.

The final composition thus obtained may then be calendered, for example in the form of a sheet or a slab, in particular for laboratory characterization, or else is extruded, for example to form a rubber profiled element used for manufacturing a tread.

The invention relates to the rubber compositions, tyres and tyre treads described above, both in the uncured state (i.e., before curing) and in the cured state (i.e., after crosslinking or vulcanization).

III—EXEMPLARY EMBODIMENTS OF THE INVENTION

III.1—Preparation of the Compositions

The tests which follow are carried out in the following manner: the filler (silica or carbon black), the coupling agent in the presence of silica, the ENR, the alpha-methylstyrene polymer resin (here, a phenol-modified styrene/alpha-methylstyrene copolymer) and also the various other ingredients, with the exception of the vulcanization system, are successively introduced into an internal mixer (final fill ratio: around 70% by volume), the initial vessel temperature of which is around 60° C. Thermomechanical working (non-productive phase) is then carried out in one stage, which lasts in total approximately 3 to 4 minutes, until a maximum "dropping" temperature of 165° C. is reached.

The mixture thus obtained is recovered and cooled and then sulphur and an accelerator of sulphenamide type are incorporated in a mixer (homofinisher) at 30° C., the combined mixture being mixed (productive phase) for an appropriate time (for example, between 5 and 12 min).

The compositions thus obtained are subsequently calendered, either in the form of slabs (thickness of 2 to 3 mm) or of fine sheets of rubber, for the measurement of their physical or mechanical properties, or extruded in the form of a tread.

III.2—Tests

These tests demonstrate the improvement, in terms of grip on wet ground and rolling resistance, provided by a composition in accordance with the invention, in comparison with a control composition.

In order to do this, two rubber compositions were prepared as indicated previously, one in accordance with the invention (denoted hereinbelow by C.2) and one not in accordance with the invention (control denoted hereinbelow by C.1).

The compositions C.1 and C.2 comprise 100 phr of ENR. The control composition C.1 comprises a polylimonene resin and the composition C.2 according to the invention comprises an alpha-methylstyrene polymer resin (phenol-modified styrene/alpha-methylstyrene copolymer).

Their formulations (in phr or parts by weight per hundred parts of elastomer) and their mechanical properties have been summarized in the appended Tables 1 and 2.

It is firstly noted that the mechanical properties (modulus MA100 and properties at break) of compositions C.1 and C.2 are substantially identical. The addition of alpha-methylstyrene polymer resin does not modify the stiffness (Shore A hardness) of the composition according to the invention, in comparison with the control C.1.

But it is especially noted that the composition C.2 according to the invention has dynamic properties which are, unexpectedly, substantially improved:

with, on the one hand, a value of $\tan(\delta)$ at 40° C. which is lower relative to the control composition C.1, synonymous, for a person skilled in the art, with a reduced hysteresis and therefore with a reduced rolling resistance; and on the other hand, a value of $\tan(\delta)$ at −10° C. which is markedly higher than that of the composition C.1, a recognized indicator of an improved grip on wet ground.

It may therefore be concluded that the above improvements are obtained by virtue of the use of the alpha-methylstyrene polymer resin.

In summary, the results of these tests demonstrate that the combined use of an epoxidized natural rubber with an alpha-methylstyrene polymer resin makes it possible to obtain an improved compromise of properties, favourable to the grip on wet ground and to the rolling resistance of tyre treads.

TABLE 1

| | Composition No. | |
|---|---|---|
| | C.1 | C.2 |
| ENR (1) | 100 | 100 |
| Filler (2) | 110 | 110 |
| Filler (3) | 4 | 4 |
| Coupling agent (4) | 8.8 | 8.8 |
| Plasticizing resin (5) | 29 | — |
| Plasticizing resin (6) | — | 29 |
| Oil (7) | 6 | 6 |
| Stearic acid (8) | 2.0 | 2.0 |
| ZnO (9) | 1.8 | 1.8 |
| Sulphur (10) | 1.3 | 1.3 |
| CBS (11) | 2.0 | 2.0 |
| DPG (12) | 1.5 | 1.5 |
| Antioxidant (13) | 1.5 | 1.5 |

(1) "ENR-25" (Guthrie Polymer);
(2) silica: "Zeosil 1165 MP" from Rhodia, of "HD" type - (BET and CTAB: around 160 m$^2$/g);
(3) carbon black N234 (ASTM grade);
(4) TESTP coupling agent ("Si69" from Degussa);
(5) polylimonene resin ("Dercolyte L120" from DRT);
(6) alpha-methylstyrene polymer resin ("Sylvares 600" from Arizona Chemical);
(7) glycerol trioleate (sunflower oil comprising 85% by weight of oleic acid - "Lubrirob Tod 1880" from Novance);
(8) stearine ("Pristerene" from Uniquema);
(9) zinc oxide (industrial grade - from Umicore);
(10) sulphur;
(11) N-cyclohexyl-2-benzothiazyl sulfenamide (Santocure CBS from Flexsys);
(12) DPG = Diphenylguanidine ("Perkacit DPG" from Flexsys);
(13) N-1,3-dimethylbutyl-N-phenyl-para-phenylenediamine (Santoflex 6-PPD from Flexsys).

TABLE 2

| | Composition No. | |
|---|---|---|
| | C.1 | C.2 |
| Shore A | 71 | 71 |
| MA 100 | 2.4 | 2.6 |
| Elongation at break | 412 | 417 |
| Tensile strength | 11 | 12 |
| $T_g(\delta)_{-10°C}$ | 0.720 | 0.860 |
| $T_g(\delta)_{40°C}$ | 0.333 | 0.310 |

The invention claimed is:

1. A rubber composition based on at least an epoxidized natural rubber (abbreviated to "ENR"), a reinforcing filler and, as plasticizing agent, an alpha-methylstyrene polymer resin having a number-average molecular weight between 400 and 2000 g/mol, a polydispersity index of less than 3, and a $T_g$ of greater than 20° C., which is miscible in the rubber composition at the content of resin and ENR present therein, and which is selected from the group consisting of homopolymers of the alpha-methylstyrene monomer and copolymers containing units derived from the alpha-methylstyrene monomer in an amount greater than 50 mol %.

2. The composition according to claim 1, wherein the ENR content is greater than 30 phr.

3. The composition according to claim 2, wherein the ENR content is greater than 40 phr.

4. The composition according to claim 3, wherein the ENR content is within a range of 50 to 100 phr.

5. The composition according to claim 1, further comprising: a diene elastomer chosen from the group consisting of polybutadienes, natural rubber, synthetic polyisoprenes, butadiene copolymers, isoprene copolymers and mixtures of these elastomers.

6. The composition according to claim 1, wherein the alpha-methylstyrene polymer resin has a $T_g$ of greater than 30° C.

7. The composition according to claim 1, wherein the alpha-methylstyrene polymer resin has a number-average molecular weight between 500 and 1500 g/mol.

8. The composition according to claim 1, wherein the alpha-methylstyrene polymer resin has a polydispersity index of less than 2.

9. The composition according to claim 1, wherein the alpha-methylstyrene polymer resin is a homopolymer.

10. The composition according to claim 1, wherein the alpha-methylstyrene polymer resin is a copolymer.

11. The composition according to claim 10, wherein the resin is a copolymer of styrene and of alpha-methylstyrene.

12. The composition according to claim 1, wherein the resin is a phenol-modified resin.

13. The composition according to claim 1, wherein the content of alpha-methylstyrene polymer resin is within a range of 5 to 60 phr.

14. The composition according to claim 13, wherein the content of alpha-methylstyrene polymer resin is within a range of 10 to 50 phr.

15. The composition according to claim 1, wherein the reinforcing filler comprises carbon black and/or silica, or both.

16. The composition according to claim 1, wherein the amount of reinforcing filler is greater than 50 phr.

17. The composition according to claim 16, wherein the amount of reinforcing filler is between 50 and 150 phr.

18. A tire comprising: a rubber composition according to claim 1.

19. The tire according to claim 18, the rubber composition being present in the tread of this tire.

* * * * *